United States Patent [19]

Epstein

[11] Patent Number: 4,653,540
[45] Date of Patent: Mar. 31, 1987

[54] PLUG FOR HEAT EXCHANGER TUBES

[76] Inventor: Norman Epstein, Rte. 301, Carmel, N.Y. 10512

[21] Appl. No.: 699,730

[22] Filed: Feb. 8, 1985

[51] Int. Cl.⁴ ............................................. F16L 55/00
[52] U.S. Cl. ........................................ 138/89; 165/71
[58] Field of Search ........................... 138/89; 165/71; 220/235; 411/44, 49, 53, 56, 71

[56] References Cited

U.S. PATENT DOCUMENTS

| | | | |
|---|---|---|---|
| 1,886,419 | 11/1932 | Oberhuber | 138/89 X |
| 2,764,184 | 9/1956 | Fitzhugh et al. | 138/89 |
| 3,020,929 | 2/1962 | Knecht | 138/89 |
| 3,044,496 | 7/1962 | Maisch | 138/89 |
| 3,119,177 | 1/1964 | Knecht | 138/89 X |
| 3,135,414 | 6/1964 | Lee | 138/89 X |
| 3,691,609 | 9/1972 | Ice et al. | 138/89 X |
| 3,983,904 | 10/1976 | Laviano | 138/89 |
| 4,310,029 | 1/1982 | Dudek | 138/89 |
| 4,421,137 | 12/1983 | Nasbaumer et al. | 138/89 |

Primary Examiner—James E. Bryant, III
Attorney, Agent, or Firm—Thomas R. Morrison

[57] ABSTRACT

A heat exchanger tube plug, which is used to seal the ends of heat exchanger tubes and similar conduits, comprises a hollow housing member which has at one end a relatively large open bore surrounded by a thin wall, and a relatively smaller threaded bore which communicates with the larger bore. An insert member is provided which, in use, is threaded into the smaller bore thereby causing a tapered portion which is formed on the insert member to engage the open end of the large bore causing it to expand and bear against the wall of a heat exchanger tube into which the heat exchanger tube plug has been inserted.

During use, the housing member is prevented from rotating relative to the heat exchanger tube by means of an eccentric assembly which is mounted on the end of the housing member.

12 Claims, 5 Drawing Figures

PLUG FOR HEAT EXCHANGER TUBES

BACKGROUND OF THE INVENTION

In the construction of boilers and other heat exchange equipment, used in the power generation and chemical industries, there is a need for a device which can be used to form a seal for tubes, pipes and similar conduits which transport steam, liquid or gasses under pressure. The requirements for such devices include ease of installation, relatively low cost, and the ability to maintain a seal against leakage of steam, water or other gasses or fluids, over an extended period of time, with a high degree of reliability. One of the typical requirements for such tubes is that they have a relatively thin wall in order to maximize the rate of heat transfer through these tubes. This relatively thin wall structure results in an additional requirement for an effective tube plug. Such a device must not cut into the tube wall, or in any way weaken the structure of the tubes in order to prevent degradation of the tube's resistance to failure under pressures.

It is an object of the present invention to provide a tube plug which can be quickly and easily installed in the end of a tube, usually within a heat exchanger tube sheet, to provide an effective leakproof seal.

Another object of the present invention is to provide a tube seal capable of withstanding operational pressures.

Another object of the present invention is to provide a tube plug which can provide a seal against both liquids and gasses.

Another object of the present invention is to provide a tube plug which does not weaken the tube during or after installation.

Still another object of the present invention is to provide a tube plug comprising a relatively small number of simple component parts resulting in a relatively low manufacturing cost.

SUMMARY OF THE INVENTION

In accordance with the present invention, there is provided a tube plug which is used to seal the open ends of heat exchanger tubes and similar conduits. The tube plug comprises a hollow housing member and an insert member. The housing member has a cylindrical body, one end of which has a large open bore which is surrounded by a relatively thin wall and a relatively smaller threaded bore which communicates with the large bore. When the insert member is threaded into the smaller bore, a conical portion, formed on the insert member, engages and forces the end of the large bore to expand and bear against the heat exchanger tube thereby forming an effective seal.

The opposite end of the housing member is provided with an eccentric assembly which serves to prevent rotation of the housing member when the housing member is inserted into the end of a heat exchanger tube. The eccentric assembly includes a cylindrical post which projects from the front of the housing assembly, and a ring member which is rotatably and eccentrically mounted on the post. The assembly may also include a coil spring which is mounted on the ring member and which surrounds the ring member. The coils of the spring are proportioned so as to be spaced slightly apart from the surface of the ring in the unstressed state.

In use, the insert member is threaded into the housing member, by hand, using a minimal amount of force until the conical portion of the insert member just engages the open end of the large bore. The eccentrically mounted ring member is rotated, by hand, until the ring member is concentric with the body of the housing member, the coil spring is compressed, also by hand, and the tube plug is inserted into the open end of a heat exchanger tube. The exposed end of the insert member is rotated, using a wrench, in a direction which threads the insert member into the housing member. The coil spring at this point has expanded and bears against the inside surface of the heat exchanger tube. Rotation of the insert member causes rotation of the housing member and starts to cause rotation of the eccentrically mounted ring member. Further rotation of the insert member causes the ring member to jam against the coil spring and force the coil spring to bear against the inside surface of the heat exchanger tube, thereby preventing additional rotation of the housing member. As rotation of the insert member continues, the insert member is threaded further into the housing member and the conical portion of the insert member causes the end portion of the large bore to expand and bear against the inside surface of the heat exchanger tube, thereby forming an effective seal.

Additional objects and advantages of the invention will become apparent during the course of the following specification when taken in connection with the accompanying drawings in which:

DESCRIPTION OF THE PREFERRED EMBODIMENTS

Figure 1:
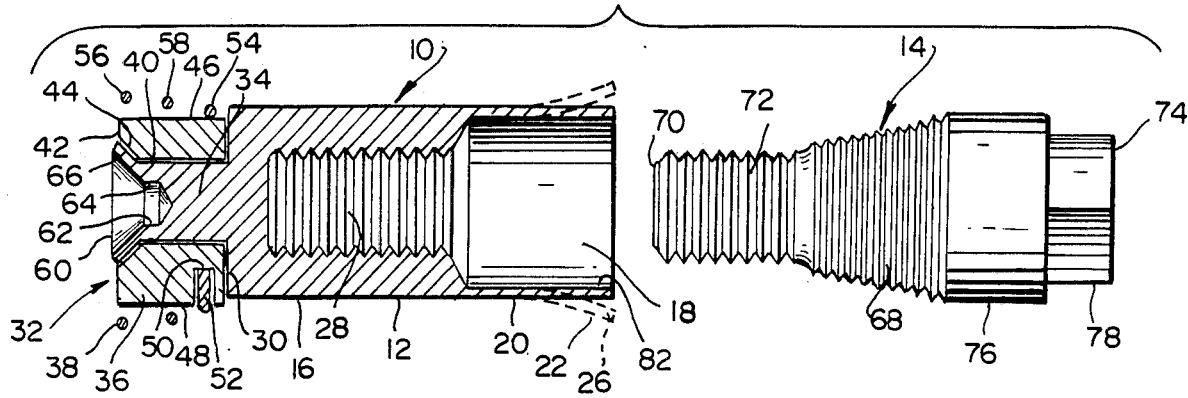
FIG. 1 is an exploded view of a heat exchanger tube plug made in accordance with the present invention, with a portion of the apparatus shown in cross-section.

With reference to the drawings there is shown in FIG. 1 a boiler tube plug 10, made in accordance with the present invention, which comprises a hollow housing member 12 and an insert member 14. The housing member 12 has a cylindrical body 16, the rear portion of which is formed with a large open bore 18. The bore 18 is surrounded by a relatively thin wall 20 the end portion 22 which will expand outwardly to provide a seal for a boiler tube 24, as is shown in broken line 26 in FIG. 1, when the insert member 14 is screwed into the housing member 12. The housing member 12 also includes a relatively smaller internally threaded cylindrical bore 28 which communicates with the large bore 18.

Figure 2:
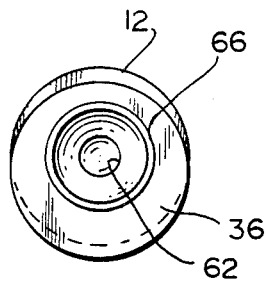
FIG. 2 is an end view of the apparatus of FIG. 1 with the spring member removed.
Figure 3:
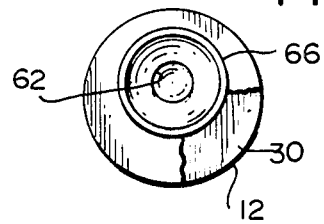
FIG. 3 is an end view of the apparatus, similar to FIG. 2 with the ring member shown rotated so that it is concentric with the body of the housing member.
Figure 4:
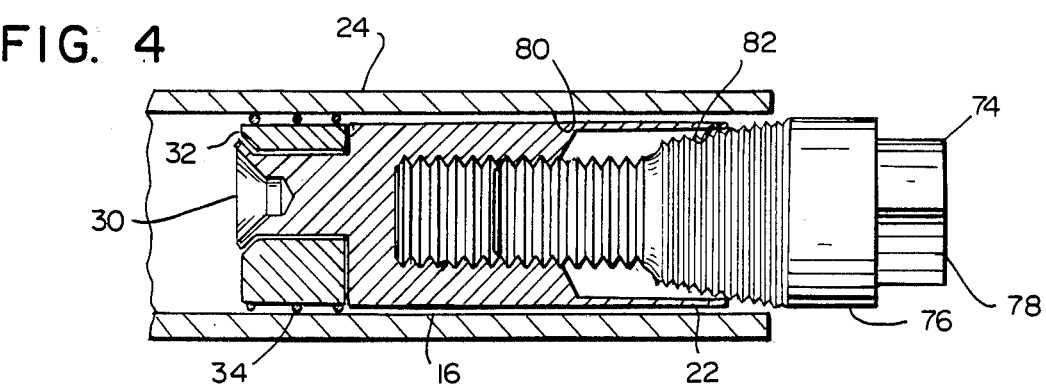
FIG. 4 is a cross-sectional view of the apparatus of FIG. 1 with the apparatus shown assembled and inserted into the end of a boiler tube.
Figure 5:
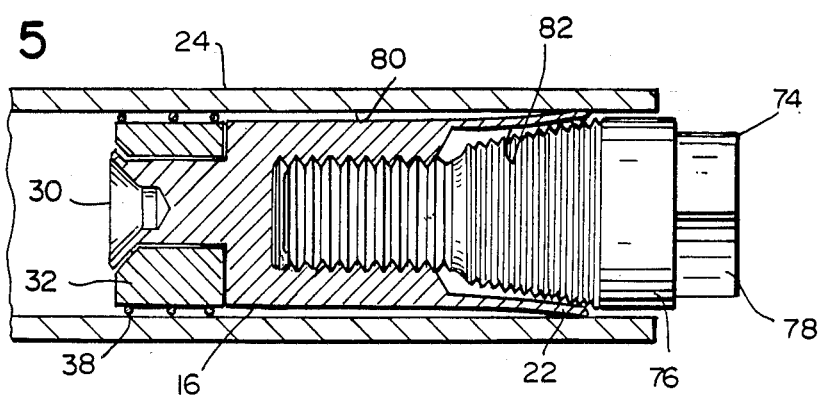
FIG. 5 is a cross-sectional view similar to FIG. 4 with the apparatus shown sealing the end of a boiler tube.

At its front end 30, the housing member 12 is provided with an eccentric assembly 32 which serves to lock the housing member 12 tightly within the boiler tube 24, as is shown in FIGS. 4 and 5, so that the insert member 14 can be screwed into the housing member 12. The eccentric assembly 32 comprises a cylindrical post 34 which projects from the front end 30 of the housing member 12, a ring member 36 which is mounted eccentrically on the post 34 and is rotatable thereon, as shown in FIGS. 2 and 3, and a coil spring 38 which surrounds the ring member 36. As is shown in FIGS. 1, 2 and 3, the post 34 is disposed eccentrically relative to the longitudinal axis of the housing member 12.

The ring member 36 has a bore 40 which fits rotatably over the post 34 and the front 42 of the ring member has a chamfered portion 44. As is shown in FIGS. 1, 2 and 3, the bore 40 is eccentrically located relative to the cylindrical surface 46 of the ring member 36. The rear portion 48 of the ring member 36 has a blind hole 50 into which a tang or bent end portion 52, of the coil spring 38 projects. The first coil 54 of the spring 38 is proportioned to fit relatively closely over the surface 46 of the ring member 36. Additional coils of the spring 38 which are shown typically as coils 56 and 58 are spaced slightly apart from the surface 46 of the ring member 36. The function of the spring 38 and the ring member 36 will be described presently in connection with the operation of the heat exchanger tube plug 10.

The post 34 is integrally formed on the front end 30 of the housing member 12, and the end 60 of the post 34 has a bore 62. The wall 64 surrounding the bore 62 is relatively thin. The post 34 is eccentrically disposed relative to the body 16 of the housing member 12. During the fabrication of the heat exchanger tube plug 10, the post 34 is inserted into the bore 40 formed in the ring member 36 and the end portion 66 of the wall 64 is flared outwardly, thereby retaining the ring member 36 on the post 34.

The insert member 14 has an elongated body portion 68 which is tapered and threaded. At its inner end 70, the insert member 14 has a threaded shank 72 which is sized to be received in the threaded smaller bore 28 of the housing member 12. At its outer end 74 the insert member 14 has a cylindrical portion 76 and a centrally-disposed, integrally formed, nut portion 78. The nut portion 78 is proportioned so that it may be grasped by a wrench for screwing the insert member 12 into the housing member 12. It will be appreciated that instead of the projecting nut portion 78, a hexagonal recess may be formed in th end of the cylindrical portion 76 for insertion of a hex wrench or similar tool. Both the insert member 14 and the housing member 12 are integrally formed and the insert member 14, the housing member 12, and the ring member 36 are made of steel.

In use, the insert member 14 is inserted into the housing member 12 and the threaded shank 72 is screwed into the threaded bore 28 until the threaded surface of the body portion 68 engages the mouth of the large bore 18 and the insert member 14 can no longer be turned by hand. The eccentric ring member 36 is rotated relative to the post 34, by hand, until it is concentric with the body 16 of the housing member 12, as is shown in FIG. 3. In this condition, the heat exchanger tube plug 10 is sized so that it may be inserted into the end of a heat exchanger tube 24 to the position shown in FIG. 4. The coil spring 34 surrounding the ring member 36 is slightly compressed and applies some pressure against the inner surface 80 of the heat exchanger tube 24.

The nut portion 78 is now turned with a wrench which causes the ring member 36, which is gripped by the end portion 52 of the coil spring 38, to turn on the post 34 toward the eccentric position shown in FIG. 2. The ring member 36 thus presses the spring coils 54, 56, 58 tightly against the inner surface 80 of the heat exchanger tube 24 so that the ring member 36 can no longer turn on the post 34 and the housing member 12 is tightly locked against turning within the heat exchanger tube 24.

When the nut portion 78 is further turned by the wrench, the insert member 14 turns within the housing member 12, with the threaded shank 68 screwing further into the small bore 28. At the same time, the threaded portion 68 of the insert member 14 engages the inner surface 82 of the large bore 18 and as this increasing diameter of the tapered insert member 14 enters the large bore 18, it deforms the surrounding thin wall 20 of the housing member 12 outwardly, increasing its diameter as is shown in FIGS. 1 and 5. As the diameter of the thin wall 20 increases, the expanded end portion 22 engages the inner surface 80 of the heat exchanger tube 24 and makes an effective seal therewith.

It is to understood that the heat exchanger tube plug 10 is particularly adapted for use to seal heat exchanger tubes which extend through a tube sheet, and the plug 10 is inserted into the heat exchanger tube within the depth of the tube sheet. Since the thick tube sheet supports and closely surrounds the end of the tube, any leaks between the tube and the tube sheet are effectively sealed by expansion of the tube plug 10 and corresponding expansion of the tube 24.

Under some conditions, it has been found that the coil spring 38 may not be necessary for initially anchoring the eccentric assembly 32. In heat exchangers where the tubes are disposed horizontally, the weight of the eccentric assembly 32 is often sufficient to lock the latter in place. Particularly, if the body of the eccentric assembly 32 and the adjacent portion of the cylindrical body 16 are knurled, these portions become sufficiently resistant to turning to withstand the torque employed in expanding the plug. In heat exchangers having vertically-disposed tubes, however, the coil spring 38 or an equivalent device is necessary to hold the eccentric member against initial rotation.

While a preferred embodiment of the invention has been shown and described herein, it is obvious that numerous additions, changes, and omissions may be made in such embodiment without departing from the spirit and scope of this invention.

What is claimed is:

1. A heat exchanger tube plug for sealing the ends of heat exchanger tubes, comprising a cylindrical housing member sized for insertion within the end portion of one of said heat exchanger tubes, said housing member having a longitudinal blind bore comprising a smooth portion communicating with a threaded portion, eccentric locking means mounted on said housing member for locking the inserted housing member against rotation relative to said heat exchanger tube, and an insert member having a threaded end portion received within the threaded portion of said bore, and an enlarged portion positioned to be drawn within the smooth portion of said bore in response to rotation of said insert member threaded end portion in said bore threaded portion, and a tapered portion between said end portion and said enlarged portion, said tapered portion and said enlarged portion being sized to cause said smooth portion of said bore to expand, thereby providing a seal between said housing member and said heat exchanger tube.

2. A heat exchanger tube plug according to claim 1 in which said bore comprises a relatively smaller threaded portion and a relatively larger smooth portion.

3. A heat exchanger tube plug according to claim 1 in which said smooth portion of said bore is surrounded by a relatively thin wall portion of said housing member.

4. A heat exchanger tube plug according to claim 1 in which said tapered portion includes external threads thereon contactable with said smooth portion during drawing of said insert member into said housing member.

5. A heat exchanger tube plug according to claim 4 in which said tapered portion of said insert member includes a portion having a diameter smaller than the diameter of said smooth portion of said bore and a portion having a diameter greater than the diameter of said smooth portion of said bore.

6. A heat exchanger tube plug according to claim 4 in which said insert member comprises a second end having means for gripping formed thereon.

7. A heat exchanger tube plug according to claim 6 in which said means for gripping comprises an integrally formed nut portion.

8. A heat exchanger tube plug according to claim 1 in which said eccentric locking means comprises a post portion formed on an end of said housing member opposite said bore and an eccentric ring member rotatably mounted on said post portion.

9. A heat exchanger tube plug according to claim 8 in which said post portion is disposed eccentrically relative to the longitudinal axis of said housing member.

10. A heat exchanger tube plug for sealing the ends of heat exchanger tubes, comprising:

a cylindrical housing member sized for insertion within the end portion of one of said heat exchanger tubes;

said housing member having a longitudinal bore comprising a smooth portion communicating with a threaded portion;

eccentric locking means mounted on said housing member for locking the inserted housing member against rotation relative to said heat exchanger tube;

an insert member having a threaded end portion receivable within the threaded portion of said bore;

an enlarged portion on said insert member positioned to be drawn within the smooth portion of said bore in response to rotation of said insert member threaded end portion in said bore threaded portion;

said enlarged portion being sized to cause said smooth portion of said bore to expand, thereby providing a seal between said housing member and said heat exchanger tube;

said eccentric locking means including a post portion formed on an end of said housing member opposite said bore and an eccentric ring member rotatably mounted on said post portion; and a spring mounted on said eccentric ring member.

11. A heat exchanger tube plug according to claim 10 in which spring comprises a coil spring having a plurality of coils surrounding said eccentric ring member.

12. A heat exchanger tube plug according to claim 11 in which said coils are spaced slightly apart from said eccentric ring member.

* * * * *